Patented June 28, 1949

2,474,228

UNITED STATES PATENT OFFICE 2,474,228

MAKING PROTEINACEOUS AND FATTY FOODS RESISTANT TO MICROORGANISMS

Gerald H. Coleman and Paul A. Wolf, Midland, Mich., assignors to The Dow Chemical Company, Midland, Mich., a corporation of Delaware No Drawing. Application January 13, 1947, Serial No. 721,878

14 Claims. (Cl. 99—150)

This invention relates to a method for imparting to proteinaceous and fatty foods increased resistance to attack by microorganisms such as fungi and bacteria, and to the so-treated products. It relates in particular to a method for imparting such increased resistance to cheese and meat products.

It is a matter of common knowledge and experience that foodstuffs rich in protein or fat (i. e. those containing over 50 per cent of protein, or of fat, or of the two together, based on the total weight of food solids present), such as meats, cheeses and butter, are subject to attack by fungi and bacteria. The growth of such microorganisms is not always injurious to the foodstuffs, but may give the food an unpleasant appearance or an unnatural flavor which may make the product unsalable or unpalatable to the consuming public. Various materials have been suggested to inhibit or retard the growth of microorganisms in foods, but none are as successful as may be desired. Some prior inhibitors are short-lived in their effect. Some are too selective for general use. Others contribute a distinct and undesirable flavor to foods. Some are toxic and cannot be used safely in foods for human consumption. Most of the prior inhibitors modify the pH of the foods, or require particular pH conditions for antimicrobial effectiveness, and this makes them difficult to use and to control.

The problem of imparting to cheese a resistance to attack by microorganisms is complicated by the fact that cheeses are themselves the result of the action of microorganisms on milk. Each type of cheese is the product of a particular microbial culture, which gives it a characteristic texture and flavor. Hence, while stray cultures are undesirable, as tending to give unnatural flavors to the cheese, no inhibitor of the growth of microorganisms can be introduced into the milk during the cheese-making process, because the desired culture could not grow. In some cases, however, it is desirable to stop the growth, not only of the principal inoculum but also of any "stray" air-borne inoculum after the cheese making process has been carried to a desired end point, and in such case an inhibitor might be used, either in a wrapper or other covering for the cheese, or as an additive incorporated in the softer types of cheese "spreads."

In the case of meats and fats the problem is primarily that of making the ready-to-market product resistant to attack by molds and bacteria which often grow on the surfaces of solid meat and fat products and internally of ground meats, both in bulk and in pressed or encased form.

It is accordingly among the objects of the present invention to provide a method for imparting to proteinaceous and fatty foods an increased resistance to attack by microorganisms such as fungi and bacteria whose growth is normally or commonly fostered by such foods. A related object is to provide such a method, in which the means employed to impart the said resistance is an odorless material which is tasteless at use concentrations and is both non-injurious to the foods and edible by humans. A particular object is to provide a method of imparting to cheese, and especially to soft cheeses, an increased resistance to attack by microorganisms after the cheese making operation. Another object is to provide proteinaceous and fatty foods having increased resistance to attack by microorganisms through the agency of particular chemical compounds.

The method of the present invention is one for imparting to foods rich in at least one of the class consisting of proteins and fats an increased resistance to attack by microorganisms, which comprises bringing into close association with such foods a minor but effective amount of a compound selected from the class consisting of dehydroacetic acid and its edible salts. Dehydroacetic acid, which has the structural formula

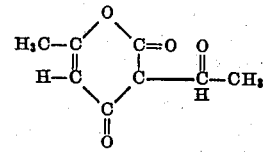

is also known as 3-acetyl 6-methyl pyrandione-2,4, and exists in both a keto form (whose formula is here given) and an enolic form. Dehydroacetic acid and its sodium, potassium, ammonium and calcium salts are non-hazardous to humans at use concentrations, and in the amounts usually employed are both tasteless and odorless. Dehydroacetic acid and its salts are essentially neutral compounds, despite the connotation of acidity in the name, and do not affect materially the pH of foods in or on which they are employed in the invention. Dehydroacetic acid is slightly soluble in water and is readily soluble in alkalies and in a variety of organic solvents, including ethyl alcohol and the glycols, and may be deposited from or used in such of these solutions as is deemed appropriate for the particular case. Dehydroacetic acid is slightly more effective when used in neutral or acid media than in an alkaline medium, and when high solubility in aqueous media is required, the neutral sodium salt is recommended. The term "edible salt" as used herein refers to those salts of dehydroacetic acid which may be ingested by humans in the small amounts present in foods containing them, without harmful effect.

The requisite close association may be obtained by incorporating the dehydroacetic acid compound in the food, where this is possible, or by applying it to the exterior of the food, or by wrapping the food in a wrapper containing the compound. The method chosen will depend largely upon the type of food to be treated. Owing to its moderately low volatility, the antimicrobial effect of dehydroacetic acid is of long duration, even in those cases in which it is applied externally of the food, and is exposed to the atmosphere. While the amount of dehydroacetic acid, or salt thereof, to be used may vary considerably, depending on the type of food to which it is to be applied and the conditions and microorganisms which the food may be expected to encounter, a significant measure of resistance to attack is found to be imparted to proteinaceous and fatty foods through the use of 0.01 to 0.5 per cent of dehydroacetic acid, based on the weight of food, and that fungus-repressing wrapping sheets need not contain over 10 per cent, and usually not over 5 per cent, by weight of dehydroacetic acid.

The following specific examples illustrate the practice of the invention, but are not to be construed as limiting the invention either to the foods specifically disclosed or to the microorganisms whose growth is shown to repressed.

Example 1

An acute problem of microbial decomposition is presented by the various cheese spreads, and especially by the soft, normally white, creamy variety known by the trade-name "Philadelphia" cream cheese. Bacteria and mold counts on this product have shown it to contain over one billion organisms per gram of cheese. While the predominating organisms may vary from time to time, it has now been found that this type of cheese may be preserved and protected for as long as 3 weeks at room temperature against bacterial decomposition and mold growth by mixing therewith, while the cheese is fresh, about 0.1 per cent of dehydroacetic acid. Thus, concentrations of 0.06 per cent, or less, of dehydroacetic acid do not completely inhibit bacterial decomposition, which occurs within a week at room temperature. From 0.07 to 0.09 per cent of dehydroacetic acid protects the cheese under these conditions for over a week but not as long as 3 weeks. By way of contrast, some of the cheese containing 0.5 per cent of calcium propionate (a commercial fungistat) had considerable mold growth and gave evidence of bacterial decomposition when exposed to the air for 5 days at room temperature. Additional samples were treated with 0.1 per cent of ethyl vanillate, which has been suggested as a preservative in cheese spreads. Large growths of mold had appeared within 6 days, of about one-fourth the size of growths appearing in the same time on the untreated control.

Example 2

When tested in a manner similar to that set forth in Example 1, a pimiento-flavored cheese spread was found to be kept fresh and palatable and free from microbial growth by incorporating therein from 0.01 to 0.05 per cent by weight of dehydroacetic acid. The incubation period was 13 days and the temperature was 85° F. The untreated control was badly molded and decomposed by the same exposure.

Example 3

Slightly higher concentrations of dehydroacetic acid than those found satisfactory in Example 2 are required for the preservation of a pineapple-flavored cheese spread. When such a commercial product was exposed in its original form to the atmosphere for 13 days at 85° F., a heavy growth of a dark mold appeared thereon. The incorporation of 0.01 per cent of dehydroacetic acid into the spread gave a substantially improved but incompletely protected product. Samples containing 0.05 per cent of this antimicrobial agent were completely inhibited against microbial growth at the end of the 13 day test.

Example 4

Because of the common problem of spoilage in frankfurters, mixtures of dehydroacetic acid and commercially ground frankfurter meat were prepared and exposed to air for 7 days at 85° F. Those samples containing 0.2 per cent of dehydroacetic acid were free from visible growths and had a "fresh" or "sweet" smell. Samples containing 0.1 per cent of the added agent showed traces of visible growths, and had the odor characteristic of decomposing meat. The untreated control was covered with several varieties of fungus growths and had a putrid smell.

Example 5

Smoked ham, bacon and "Canadian bacon" commonly develop a superficial mold growth in storage, which growth gradually penetrates into and creates an off-flavor in the meat. When such meats are washed or sprayed with, or dipped into neutral aqueous solutions, or aqueous alcoholic solutions containing from 0.05 to 0.2 per cent of dehydroacetic acid, and then dried, or are enclosed in wrappers containing such agent, the growth of such mold is effectively inhibited throughout normal storage periods.

Example 6

Butter and some other fats tend to mold under some conditions of storage. In an accelerated test, butter has been inoculated with spores of *Penicillium expansum*, a mold which thrives in a medium rich in fats. Portions of this butter were mixed with from 0.01 to 0.1 per cent by weight of dehydroacetic acid. The various samples were stored together until the sample containing no dehydroacetic acid had a heavy mold growth. The treated samples were found to be free from mature mold. Similar advantageous results are obtained when mayonnaise, another fatty food, is mixed with small amounts of dehydroacetic acid, in the order of 0.05 per cent.

Example 7

Nearly all varieties of cheese are susceptible to the growth of molds. This is deemed to make most cheese unattractive, and reduces its marketability in retail outlets. Packaged cheese which is first unwrapped by the consumer and may be cut and used over an extended period of time often becomes coated with molds after being unwrapped. It has now been found that the growth of these apparently undesirable molds can be prevented by wrapping the cheese, either before or after it has been cut into, with a wrapper which has been coated or impregnated with dehydroacetic acid. It is common practice in stores to apply a piece of parchment or other paper to the cut face of a block of cheese to prevent drying. When such paper is treated to contain from 0.5 to 5 per cent of dehydroacetic acid, it now serves the additional function of preventing mold growth.

Among the common microorganisms which may contaminate foods are those named above as well as the following partial list, and it has been found that proteinaceous and fatty foods may have imparted to them, by a treatment with dehydroacetic acid, a resistance to the growth of these organisms: *Penicillium digitatum, Penicillium expansum, Aspergillus niger, Rhizopus nigricans, Lactobacillus plantarum, Aerobacter aerogenes, Fusarium oxysporium, Sclerotium rolfsii, Bacillus mesentericus*, etc. Various other bacterial contaminants, some of which are pathogenic, may also be encountered in and on the foods here concerned, especially when the food is not handled under fully sanitary conditions. It has been found that dehydroacetic acid has an antibacterial action on a variety of pathogenic bacteria, *in vitro*, and it can be expected to make foods containing it more resistant to the proliferation of these bacteria, a partial list of which follows: *Staphylococcus aureus, Eberthella typhosa, Escherichia coli, Alcaligenes fecalis, Bacillus subtilis, Pseudomonas aeroginosa, Staphylococcus hemolyticus, Bacillus megatherium, Bacillus cereus*, etc.

The foregoing examples have illustrated the manner in which resistance to attack by microorganisms may be imparted to foods by incorporating dehydroacetic acid or its salts in the food, as well as by applying one of these agents to the surface of the food or enclosing the food in a wrapper which contains dehydroacetic acid. This effect has been obtained through the use of amounts of dehydroacetic acid less than 1 per cent (usually less than 0.5 per cent and often less than 0.1 per cent) of the weight of the food. In no case was the color, odor or taste of the food altered by the treatment.

The treatment of foods rich in carbohydrates with dehydroacetic acid or its salts is described and claimed by us in an application filed concurrently herewith, Serial No. 721,877; and the use of dehydroacetic acid in the treatment of light alcoholic fermented beverages is disclosed and claimed in another of our concurrently filed applications, Serial No. 721,879. Anti-fungal wrapping sheets containing these agents form the subject matter of yet another application filed by us concurrently herewith, Serial No. 721,880.

We claim:

1. The method of imparting to foods rich in at least one of the class consisting of proteins and fats an increased resistance to attack by microorganisms, which comprises bringing into contact with such foods a minor but effective amount of a compound selected from the class consisting of dehydroacetic acid and its sodium, potassium, ammonium, and calcium salts.

2. The method of imparting to foods rich in at least one of the class consisting of proteins and fats an increased resistance to attack by microorganisms, which comprises incorporating in the food a minor but effective amount of a compound selected from the class consisting of dehydroacetic acid and its sodium, potassium, ammonium and calcium salts.

3. The method of imparting to foods rich in at least one of the class consisting of proteins and fats an increased resistance to attack by microorganisms, which comprises applying to the surface of the food a minor but effective amount of a compound selected from the class consisting of dehydroacetic acid and its sodium, potassium, ammonium and calcium salts.

4. The method of imparting to foods rich in at least one of the class consisting of proteins and fats an increased resistance to attack by microorganisms, which comprises enclosing the food in a wrapper containing an effective amount of a material selected from the class consisting of dehydroacetic acid and its sodium, potassium, ammonium and calcium salts.

5. The method of imparting to foods rich in at least one of the class consisting of proteins and fats an increased resistance to attack by microorganisms, which comprises bringing dehydroacetic acid into contact with such foods.

6. The method of imparting to foods rich in at least one of the class consisting of proteins and fats an increased resistance to attack by microorganisms, which comprises incorporating a minor but effective amount of dehydroacetic acid in the food.

7. The method of imparting to foods rich in at least one of the class consisting of proteins and fats an increased resistance to attack by microorganisms, which comprises applying a minor but effective amount of dehydroacetic acid to the surface of the food.

8. The method of imparting to foods rich in at least one of the class consisting of proteins and fats an increased resistance to attack by microorganisms, which comprises enclosing the food in a wrapper containing an effective amount of dehydroacetic acid.

9. The method of imparting to meat an increased resistance to attack by microorganisms which comprises bringing the meat into contact with a minor but effective amount of dehydroacetic acid.

10. The method of imparting to cheese an increased resistance to attack by microorganisms which comprises bringing the cheese into contact with a minor but effective amount of dehydroacetic acid.

11. The method of imparting to cheese an increased resistance to attack by microorganisms which comprises enclosing the cheese in a wrapper containing an effective amount, up to about 5 per cent by weight of the wrapper, of a compound selected from the group consisting of dehydroacetic acid and its sodium, potassium, ammonium and calcium salts.

12. The method of imparting to soft cheese an increased resistance to attack by microorganisms which comprises incorporating in the cheese, after its manufacture, a minor but effective amount of dehydroacetic acid.

13. As an article of manufacture, a soft cheese containing sufficient dehydroacetic acid to impart to the cheese resistance to the growth of microorganisms.

14. Cheese, enclosed in a wrapper containing up to about 5 per cent of the weight of the wrapper of dehydroacetic acid.

GERALD H. COLEMAN.
PAUL A. WOLF.

REFERENCES CITED

The following references are of record in the file of this patent:

UNITED STATES PATENTS

| Number | Name | Date |
|---|---|---|
| 2,127,879 | Martin | Aug. 23, 1938 |
| 2,157,633 | Schapiro | May 9, 1939 |
| 2,229,204 | Boese | Jan. 21, 1941 |
| 2,265,522 | Farkas | Dec. 9, 1941 |
| 2,374,620 | Prinz | Apr. 24, 1945 |

FOREIGN PATENTS

| Number | Country | Date |
|---|---|---|
| 115,695 | Australia | Aug. 6, 1942 |

OTHER REFERENCES

Ind. Eng. Chem., vol. 32, pages 16–22, 1940, article by A. B. Boese, Jr.